Figures 1A, 1B:
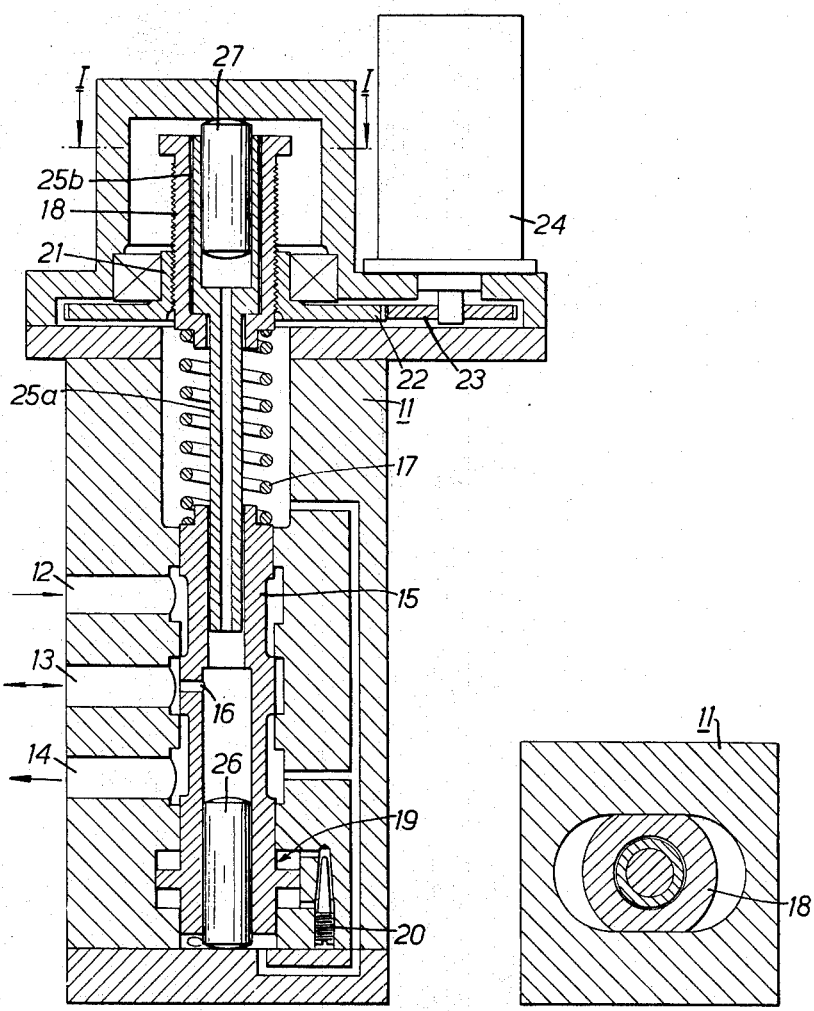

Jan. 4, 1966

R. B. SIMS ETAL 3,227,172

PRESSURE REGULATING VALVE WITH BALANCED
SPRING ADJUSTING MEANS
Filed May 29, 1963

INVENTORS
RAYMOND B. SIMS
BELA I. BATHORY
BY
Holcombe, Wetherill & Brumbois
ATTORNEYS

United States Patent Office 3,227,172
Patented Jan. 4, 1966

3,227,172
PRESSURE REGULATING VALVE WITH BALANCED SPRING ADJUSTING MEANS
Raymond Bernard Sims, Sheffield, and Bela Istvan Bathory, Waleswood, near Sheffield, England, assignors to Davy and United Engineering Company Limited, Sheffield, England
Filed May 29, 1963, Ser. No. 284,054
Claims priority, application Great Britain, May 31, 1962, 21,004/62
5 Claims. (Cl. 137—116.3)

The present invention relates to an improved hydraulic pressure regulating valve for use with a mechanism for determining the tension, by means of loopers, in elongate material moving through multi-stand rolling mills. By the term "looper" is meant a mechanism including a looper roller which is forced against the material moving between two stands of a mill, thus affecting the interstand tension.

In this connection reference is made to the copending applications Serial No. 141,475, filed September 28, 1961, now Patent No. 3,169,422, granted February 16, 1965, and Serial No. 73,162 filed December 1, 1960, wherein detection and/or control systems and preferred loopers are disclosed for use with the instant regulating valve.

In one aspect the present invention provides an improved hydraulic pressure regulating valve whereby the output supply pressure can be directly controlled in predetermined relation to a given input supply pressure without the intermediary of a pump as in the stall valves of the first-mentioned cognate applications above.

By the use of such an improved valve the present invention provides in other aspects improved arrangements for the detection and/or control of tension in moving elongate material.

The more apparent advantages of the present invention will be seen to be that faster responses are obtained in operation as a result of employing pressure regulating valves of the improved form to effect direct hydraulic pressure control. Also it is possible, by virtue of the present invention, to employ a single or at least a reduced number of pumping means to supply hydraulic fluid at predetermined input pressure to a plurality of pressure regulating valves at one or more looper stations where otherwise it would normally be necessary to employ individual pumping means for each looper station.

In order that the present invention may be clearly understood the same will now be more fully described, by way of example, with reference to the accompanying drawings, in which:

FIGURES 1a and 1b illustrate one embodiment of an improved hydraulic pressure regulating valve.

In the valve of FIGURE 1a the valve body 11 has three ports of which the uppermost port 12 is for input fluid supply, the middle port 13 is for regulated fluid output supply, and the lowermost port 14 is the drain or tank port. Within the valve body 11 is a hollow spool 15 which is arranged to slide in response to two forces for balance therebetween and so regulate the output pressure for port 13. One of the two forces acting on the spool 15 is due to the regulated output supply and is produced by entry of fluid at regulated pressure into the hollow of spool 15 through a port 16 in the spool wall. The pressure of this fluid acting on the annular area within the spool tends to move the spool upwardly. The other force acting on spool 15 is the spring force of a spring 17 acting between the top of the spool and a screw 18 which is adjustably mounted within the upper valve body as hereinafter described.

In operation, if there is a demand in the output from port 13, the regulated pressure will drop so that the spring force acting on spool 15 exceeds that due to the regulated pressure, and moves the spool downwardly. On moving down the spool 15 connects port 12 with port 13 and fluid will pass from the former to the latter until the regulated pressure is increased such that its effect on the spool 15 balances the spring force. On the other hand, if the regulated pressure increases above that necessary to balance the spring force, that is to balance the spool 15, the spool will move upwardly to connect port 13 with port 14. In this case, fluid will pass from port 13 to the tank with a resultant decrease in the regulated pressure until balance is attained.

A dash-pot arrangement 19 is incorporated in the bottom part of the valve for the purpose of stabilisation, and the damping effect produced thereby is adjustable by virtue of a screw 20, adjustment of which will be seen to adjust the effective section of the communicating passage between the two chambers of the dashpot 19.

It will be appreciated from the above description that the valve of FIGURE 1 will provide a fluid supply from port 13 at regulated pressure predetermined by a force exerted on spool 15 by spring 17. Adjustment of the regulated pressure is provided by longitudinal adjustment of the screw 18 to vary the spring force on spool 15, and this longitudinal adjustment is achieved by rotation of a supporting nut 21 for screw 18. Nut 21 is provided with a flange in the form of a toothed gear wheel 22 to facilitate rotation of the nut, via an intermediate gear wheel 23, by means of an electric motor 24, handle, or any other suitable means. In order that the screw 18 shall move longitudinally without rotation, it is provided with flat sides which engage the valve body 11, as shown in the section I—I of FIGURE 1b.

A further feature of the valve of FIGURE 1 is the provision of an arrangement whereby the spring force acting on screw 18 is balanced hydraulically to reduce the necessary torque required to rotate the screw for compression of spring 17. A hollow balance spool 25 is provided for this purpose and has an open ended stem portion 25a slidably engaged at one end in the upper open end of spool 15 and integrally connected at its other end with a spool portion 25b seated inside the screw 18.

Considering the section of FIGURE 1a, it will be seen that the interiors of both spools 15 and 25 are filled with fluid at regulated pressure. The area of the internal shoulder of spool portion 25b is arranged to equal the total area of the internal shoulder of spool 15 together with the lower annular face of spool stem 25a. Considering then the forces acting on the screw 18 and so giving rise to a shear between screw 18 and nut 21 against which rotation is to be effected for adjustment of screw 18, these forces are due to the spring 17 acting upwardly and the regulated pressure acting downwardly on an area equal to that of the internal shoulder of spool 15. Thus, when the valve is balanced these forces are equal and the screw 18 is also balanced and the torque required to adjust screw 18 has to overcome no sheer force, and when the valve is out of balance these two forces differ by an amount equal to the out-of-balance force tending to move spool 15 and the torque required to adjust screw 18 need only overcome a shear force equal to such out-of-balance force. At no time does the torque required to adjust screw 18 require to overcome a shear force arising from the whole spring force.

The above hydraulic balancing feature for screw 18 can also be achieved by admitting fluid at regulated pressure to the top of the valve through external piping, or through suitably drilled holes in the valve body 11, to act downwardly on screw 18 via a suitably proportioned plunger. In this arrangement there will, of course, be no conduit for fluid at regulated pressure through the balance spool 25 from within the main spool 15.

Both spools 15 and 25 are sealed at their outer open ends by means of plungers 26 and 27, respectively.

It will be appreciated that the valve of FIGURES 1a and 1b described above is essentially a means to regulate fluid pressure and the regulated output pressure will always be less than or equal to the input supply pressure.

Regulating valves according to the invention may be employed for the control of loopers in various modes of operation which are similar to those described in the first-mentioned cognate applications above, and they may be employed in any installation requiring an infinitely variable pressure reducing valve.

We claim:

1. A liquid pressure regulating device comprising a valve body elongately hollowed and having, sequentially relative to the axis of the hollow, a first valve port for inlet of liquid at a pressure exceeding a required value, a second valve port for outlet of liquid at regulated pressure, and a third valve port for outlet of excess liquid; a first spool coaxially and slidably mounted in the valve body hollow to substantially seal the ends of a portion of the hollow with which said valve ports communicate, the spool having a land movable therewith whereby the second valve port communicates variably and alternately with the first and third valve ports, said spool being hollowed and open at both its axial ends and having a port for communication between the second valve port and the spool hollow whereby, in operation, liquid at regulated pressure enters the spool hollow and applies a force on the spool proportional to regulated pressure and tending to effect and increase communcation between the second and third valve ports; adjustment means fixably located relative to the valve body in respect of movement along said axis and located towards the end of the valve body hollow nearer the first valve port; an annular seating member operably connected with said adjustment means and adjustable along said axis thereby; compression spring means mounted at one end on said seating member and at its other end on the adjacent spool end to apply a force on the spool tending to effect and increase communication between the first and second valve ports; said seating member having an external seating for said spring means and an internal seating in opposition thereto; means for applying a force on said seating member in opposition to the compression spring reaction thereon and substantially equal to the force applied hydraulically on the spool in proportion to regulated pressure, said force applying means comprising a balance spool having a hollow open-ended body portion seated at one end on said internal seating, and a bored stem portion connected at one end to said one end of the balance spool body portion and having its other end in sliding and sealing relationship within the hollow of the first-mentioned spool, whereby in operation liquid at regulated pressure passes from the hollow of said first spool through the balance spool bored stem portion to the hollow of the balance spool body portion; said balance spool body portion being internally dimensioned so that the liquid at regulated pressure therein applies a resultant force on the balance spool and, in turn through the seating engagement with said internal seating, on the seating member in opposition to the action of said spring means on the seating member, the hollow in said first spool comprising a main hollow portion of regular cross-section having a first cross-sectional area, and a secondary hollow portion of regular cross-section in which said balance spool stem portion slides and having a second cross-sectional area less than said first cross-sectional area, the bore in the stem portion of said balance spool being of regular cross-section, while the hollow in the body portion of said balance spool is of regular cross-section and has a third cross-sectional area substantially equal to said first cross-sectional area, and a double-acting dashpot arrangement the cylinder of which is formed by the valve body hollow, and the piston of which is formed by the first spool end further from the balance spool.

2. A device according to claim 1 comprising first and second plunger members respectively disposed within the first spool main hollow portion and the balance spool body portion hollow in sliding and sealing relationship therewith.

3. A device according to claim 1 comprising a meshing nut-and-screw arrangement the nut of which acts as said seating member and which nut is mounted in said valve body hollow for sliding along the first spool axis without rotation thereabout, and the screw of which acts as said adjustment means and which screw is mounted for rotation about said axis without translation therealong, whereby rotation of the screw effects sliding adjustment of the nut along said axis.

4. A device according to claim 3 comprising an electric servo-motor arrangement drivably coupled with said nut for controlling the rotational position thereof.

5. A device according to claim 1 wherein the valve body comprises a conduit formed therein connecting the portions of the dashpot cylinder on opposite sides of its piston, and adjustable screw means for varying the capacity of said conduit and thus the damping effect of the dashpot arrangement.

References Cited by the Examiner
UNITED STATES PATENTS

| | | | |
|---|---|---|---|
| 1,579,940 | 4/1926 | Iversen | 303—54 |
| 2,270,304 | 1/1942 | Jacobsson | 137—505.41 XR |
| 2,468,079 | 4/1949 | Kirkham | 137—538 |
| 2,741,263 | 4/1956 | Spencer | 137—116.3 |
| 2,808,068 | 10/1957 | Thomas | 137—505.18 XR |
| 2,860,662 | 11/1958 | Gres et al. | 137—469 |
| 2,984,251 | 5/1961 | Quinby | 137—116.3 |

M. CARY NELSON, *Primary Examiner.*

MARTIN P. SCHWADRON, *Examiner.*